United States Patent [19]

Knopf

[11] Patent Number: 4,481,367
[45] Date of Patent: Nov. 6, 1984

[54] HIGH VISCOSITY POLYOXYALKYLENE GLYCOL BLOCK COPOLYMERS AND METHOD OF MAKING THE SAME

[75] Inventor: Robert J. Knopf, Saint Albans, W. Va.

[73] Assignee: Union Carbide Corporation, Danbury, Conn.

[21] Appl. No.: 553,880

[22] Filed: Nov. 22, 1983

Related U.S. Application Data

[63] Continuation of Ser. No. 337,116, Jan. 5, 1982, abandoned, which is a continuation of Ser. No. 106,920, Dec. 26, 1979, abandoned.

[51] Int. Cl.$^3$ ................. C07C 125/077; C07C 125/073
[52] U.S. Cl. ...................................... 560/026; 560/115; 560/158; 252/51.5 A; 252/67; 252/79
[58] Field of Search ........................... 560/158, 26, 115

[56] References Cited

U.S. PATENT DOCUMENTS

| | | | |
|---|---|---|---|
| 2,946,767 | 7/1960 | Gassmann | 560/26 X |
| 2,948,691 | 8/1960 | Windemuth et al. | 560/26 X |
| 3,306,926 | 2/1967 | Neher et al. | 560/26 |
| 3,786,081 | 1/1974 | Oppenlaender et al. | 560/26 |

*Primary Examiner*—Bernard Helfin
*Attorney, Agent, or Firm*—Norman L. Balmer

[57] ABSTRACT

A high molecular weight, high viscosity liquid, water soluble polyoxyalkylene block copolymer suitable as a functional fluid is provided having the formula

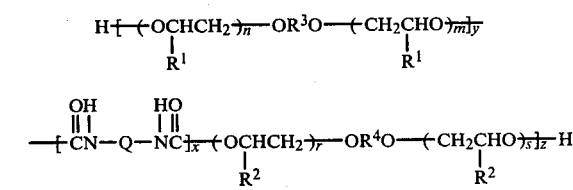

wherein Q is the organic residue from an organic diisocyanate; x is an integer in the range of about 1 to 10; $R^1$ and $R^2$ are hydrogen, methyl, ethyl, or mixtures thereof with the proviso that the overall content of species wherein $R^1$ and $R^2$ are hydrogen must be at least 50 percent by weight; $R^3$ and $R^4$ are organic residues resulting from the removal of terminal hydrogen atoms from difunctional polyols; y and z are integers representing the polyether blocks in said copolymer and the sum of which must be from about 1.05 to 2.0 times the value of x; and n, m, r, and s are integers wherein n=m and r=s and the sums n+m and r+s are each in the range of 8 to 250.

16 Claims, No Drawings

HIGH VISCOSITY POLYOXYALKYLENE GLYCOL BLOCK COPOLYMERS AND METHOD OF MAKING THE SAME

BACKGROUND OF THE INVENTION

This application is a continuation of prior U.S. application Ser. No. 337,116 filed Jan. 5, 1982 which is a continuation of application Ser. No. 106,920 filed Dec. 26, 1979, both now abandoned.

This invention relates to water soluble polyether copolymers, and, more particularly, to novel high viscosity, liquid water soluble polyoxyalkylene glycolpolyurethane copolymers suitable for use as functional fluids and to the method of preparing the same.

Water soluble poly(alkylene oxide) polymers have achieved wide scale commercial acceptance as functional fluids for a broad spectrum of applications such as lubricating fluids, hydraulic fluids, metal working lubricants, heat transfer fluids and metal-quenching medium. As functional fluids, the poly(alkylene oxide) polymers can be used in either their substantially 100% concentrated form, or, most widely, in aqueous compositions thereof where the polymer serves as both lubricant and thickening agent or viscosity builder.

Poly(alkylene oxide) polymers which are most widely used as functional fluids are, in general, copolymers that will contain both oxyethylene groups and higher oxyalkylene groups, such as oxypropylene and oxybutylene groups. The amount of oxyethylene groups in the molecule is such that the polymers are soluble in water at ordinary temperatures and the amount of oxypropylene or higher oxyalkylene groups is such that the polymers remain liquid at ordinary temperatures up to molecular weights of 40,000 and higher.

The poly(alkylene oxide) polymers can be prepared as disclosed, for example, in U.S. Pat. No. 2,425,845 to Toussaint et al., under conditions permitting control over such important parameters as molecular weight, composition, and molecular structure. Thus, for example, by appropriate selection of initiator, epoxide ratio (ethylene oxidepropylene oxide ratio), and mode of feed (mixed, sequential, gradient, etc.); poly(alkylene oxide) polymers can be prepared with generally precise controlled viscosity, solubility, cloud point, surface tension, and the like characteristics which are critical to the performance of a functional fluid.

Notwithstanding the versatility and desirability of poly(alkylene oxide) polymers as a class of functional fluids, the polymers do have some limitations such as being generally more expensive than alternate petroleum derived materials. To offset these economic limitations a combination of superior performance characteristics must be relied on. For example, in water-based systems, poly(alkylene oxide) polymers of high viscosity are required so that lower concentrations of polymer can be employed. Known, conventional poly(alkylene oxide) polymers, exhibit viscosities which are directly related to their molecular weight. However, molecular weights much greater than 20,000 are difficult to obtain from ethylene oxide-propylene oxide copolymers because of undesirable side reactions involving the propylene oxide moiety, and the costs attendant with overcoming the process difficulties of preparing high molecular weight polymers, which includes carrying out the reaction in multiple stages, further increases the costs and economic disadvantages thereof. At the same time, lower molecular weight polymers, which may be prepared in a single stage reaction, are inefficient as thickening agents and must be used at economically, prohibitive concentrations.

It would be highly desirable, therefore, to develop water soluble poly(alkylene oxide) polymers of very high molecular weights and/or viscosities that exhibit effective functional fluid characteristics and are highly efficient thickening agents for water-based systems. Moreover, the development of such polymers which could be readily and economically prepared would certainly be highly advantageous.

Within the past few years other chemical methods have been suggested for preparing high molecular weight poly(alklyene oxide) polyols such as, for example, disclosed in U.S. Pat. No. 2,990,396 to Clark et al and U.S. Pat. No. 4,113,785 to Helfert et al wherein polyoxyalkylene polyols are reacted with polyepoxides or diepoxy compounds in various ratios to prepare a variety of high molecular weight polymers that may be water insoluble and cross-linked or may be water soluble. However, in the case where water-soluble polymers are produced, the processes disclosed generally require several reaction steps and the use of molar, as compared to small catalytic quantities, of alkali metal catalysts; consequently development of a process which would be even more direct would offer some further technical as well as economic advantages.

SUMMARY OF THE INVENTION

In accordance with the present invention there are provided high molecular weight, high viscosity, primarily straight chain, liquid, water soluble, polyoxyalkylene glycol block copolymers that are suitable for use as functional fluids comprising polyoxyalkylene glycol block copolymers having the general formula:

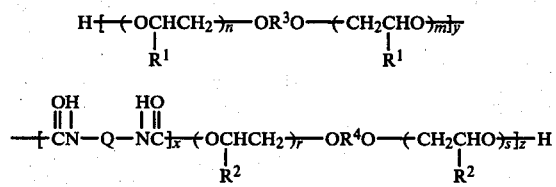

wherein Q is the organic residue from an aliphatic or aromatic diisocyanate including thoe diisocyanates of the oligomeric or prepolymer types derived from the reaction of an excess of diisocyanate with a short chain diol which contain urethane linkages; x is an integer representing the average number of polyurethane blocks in the copolymer and is in the range of 1 to 10; $R^1$ and $R^2$, which can be the same or different, are hydrogen, methyl, ethyl or mixtures thereof with the proviso that the overall content of species wherein $R^1$ and $R^2$ is hydrogen must be at least 50 percent by weight; $R^3$ and $R^4$, which can be the same or different, are organic residues resulting from the removal of terminal hydrogen atoms from difunctional polyols and may be alkylene, arylene, alkarylene, aralkylene, cycloalkylene, heterocycloalkylene radicals or mixtures thereof; y and z are integers representing the average number of polyether blocks in the copolymer with the proviso that the sum of y and z must be from 1.05 to 2.0 times the value of x; and n, m, r, and s, which may be the same or different, are integers wherein n=m and r=s and the sums of n+m and r+s, which may be the same or different, are each in the range of about 8 to 250.

The novel copolymeric compositions of the invention are water soluble materials that have utility in a wide spectrum of functional fluid applications, either in concentrated form or in water-based systems. Moreover the copolymeric compositions have been found to be highly efficient thickening agents for water-based systems, having a significantly higher viscosity than found for conventional poly(alkylene oxide) polymers of similar molecular weight.

In accordance with the invention there is also provided a process for preparing water soluble, high molecular weight poly(alkylene oxide) block copolymers which are suitable for use as functional fluids which comprises reacting, with vigorous agitation, a stoichiometric excess of a polyoxyalkylene diol containing at least 50 percent by weight of oxyethylene groups with an organic diisocyanate wherein the total equivalent of hydroxyl functionality of said diol exceeds the equivalents of isocyanate functionality by a factor in the range of from about 1.05 to 1 to 2.0 to 1 for the time necessary to prepare a hydroxyl terminated copolymer condensation product. The condensation reaction can be carried out at elevated temperatures of from about 40° C. to about 175° C. with or without a catalyst being present.

DESCRIPTION OF THE INVENTION

The polyoxyalkylene glycols suitable for use in preparing the polyoxyalkylene copolymers of the present invention are diols having the formula:

$$R[O(CH_2CHR^1O)_nH]_2$$

wherein R is an organic residue resulting from the removal of terminal hydrogen atoms from diols and may be alkylene, arylene, alkarylene, aralkylene, cycloalkylene, heterocycloarylene and the like radicals or mixtures thereof, $R^1$ is hydrogen, methyl, ethyl or mixtures thereof, and n is an integer in the range of 4 to about 125.

The suitable diols are polyoxyalkylene glycols which have a molecular weight from about 600 to about 12,500, and preferably from about 1500 to about 6,000, and contain both oxyethylene groups and higher oxyalkylene groups, such as oxypropylene and oxybutylene groups in the molecule. The amount of oxyethylene groups in the molecule is such that the polyoxyalkylene glycols are water soluble at ordinary temperatures and the amount of oxypropylene or higher oxyalkylene group is such that the polyoxyalkylene glycols remain liquid at ordinary temperatures. The oxyethyleneoxypropylene ratio may vary, but compounds suitable for use in accordance with the practice of the invention should have at least 50 percent by weight of oxyethylene groups, with a ratio of from about 60-40 to about 90-10 being preferred.

These polyoxyalkylene glycols are known in the art and are commonly produced by reacting a mixture of ethylene oxide and other alkylene oxides, such as propylene oxide, with a short chain compound having two active hydrogen atoms including, for example, dihydric alcohols, such as ethylene glycol, 1,2-propylene glycol, 1,3-propylene glycol, butylene glycols, diethylene glycol, dipropylene glycol, triethylene glycol, as well as other such aliphatic dihydroxy compounds; aromatic dihydroxy compounds such as bisphenol A; cycloaliphatic dihydroxy compounds and the like.

The polyoxyalkylene glycols can have a variety of molecular structures such as random, block, heteric (both random and block structure together), gradient (as for example, from a continuously varying programmed feed), and various other combinations. The products of reaction will have generally linear oxyalkylene chains and such chains will terminate with hydroxyl groups. Exemplary suitable polyoxyalkylene glycols are available commercially under the trademark designation UCON fluids and CARBOWAX polyethylene glycols from Union Carbide Corporation, and the trademark designations Pluronics from BASF Wyandotte.

Diisocyanates suitable for use in preparing the polyoxyalkylene copolymers of the present invention may be any of the known aromatic or aliphatic diisocyanates provided that these are clearly difunctional, i.e., they should be free of any functionality greater than 2 and essentially free of monofunctional species to avoid crosslinking and chain growth termination reactions. These isocyanates are well known to those skilled in the polyurethane art and illustrative thereof can be mentioned aromatic diisocyanates such as 4,4'-methylenebis(4-phenylisocyanate) tolylene diisocyanate, and phenylene diisocyanate which are preferred because of their high reactivities and low equivalent weights; aliphatic diisocyanates, such as 4,4'-methylenebis (cyclohexylisocyanate), and trimethylhexamethylene diisocyanate and the like, and mixtures of such diisocyanates.

Also suitable are oligomeric diisocyanates, known as prepolymers, which result from reacting a short chain glycol with substantial excess of diisocyanate to form a low to moderate molecular weight (molecular weight up to about 1500) linear urethane prepolymer terminated with —NCO groups. The choice of glycols employed in the preparation of urethane prepolymers for use in compositions of the invention should be made so that the polyoxyalkylene copolymer prepared therefrom will be water soluble.

In producing the polyoxyalkylene copolymers of the invention a stoichiometric excess of the polyoxyalkylene glycol is reacted with the diisocyanate. The copolymers of the invention must be prepared under conditions wherein the total equivalents of hydroxyl functionality exceeds the total equivalent of isocyanate functionality. The OH/NCO ratio can vary from about 1.05:1.0 and 2.0:1.0, and preferably is in the range from about 1.15:1.0 and 1.50:1.0. This stoichiometry assures the production of a copolymer terminated with hydroxyl groups which, hence, is unreactive towards water, alcohol, amines, etc. which may be used in formulating functional fluids with the copolymers of the invention.

The molecular weights of the polyoxyalkylene block copolymer compositions of the invention that are produced are less than that which may be theoretically calculated but, in general, can be varied by the choice of reactants employed. For example, the use of lower molecular weight, high oxyethylene content polyoxyalkylene glycols provides copolymers more closely approaching their theoretical molecular weights than does the use of high molecular weight polyoxyalkylene glycols of lower oxyethylene content.

The viscosities of the polyoxyalkylene copolymers of the invention are governed both by their molecular weight and by their urethane moiety content. With any given combination of reactants, the copolymer viscosity will increase with decreasing OH/NCO ratio and at a given OH/NCO ratio, the product viscosity will increase with increasing urethane moiety content. In any case, the copolymers of this invention will exhibit viscosities of from about 2 to about 5 times that of a conventional polyoxyalkylene glycol of comparable molecular weight. This is an important and surprising feature of the compositions of the present invention since the thickening efficiency of the copolymer in water-based systems is an important factor in determining the concentration of the polymer that must be used to achieve desired results from a given functional fluid formulation.

The polyoxyalkylene block copolymers of the invention can be produced by reacting one or more polyoxyalkylene glycols with one or more diisocyanates in stoichiometric proportions wherein, as hereinabove described, the total equivalent of hydroxyl functionality of the polyoxyalkylene glycol reactant exceeds the total equivalents of isocyanate functionality of the diisocyanate reactant by a factor of from about 1.05:1 to 2.0:1.

To be suitable for use in preparing the block copolymer compositions of the invention, the polyoxyalkylene glycols must be free from residual basic catalyst used in their preparation. If the residual catalyst is not removed, the ensuing condensation reaction with a diisocyanate will lead to the formation of gels. The polyoxalkylene glycol may be neutralized by any suitable method known in the art such as by ion-exchange techniques or treating the glycol under heat with a solid magnesium silicate. For example, in the ion-exchange procedure, an aqueous alcoholic solution of the basic catalyst containing polyglycol is first passed through a bed of an acidic (H-form) ion-exchange resin and the effluent is then stripped of water and alcohol diluents. In the alternate procedure, the base-containing polyglycol is first heated with magnesium silicate neutralizer for one to several hours at 50° C. to 100° C. and then recovered by filtration to remove the solid neutralizer. Regardless of the neutralizing procedure used, the hydroxyl number molecular weight of the neutralized polyoxyalkylene glycol should be determined so that the amount of diisocyanate reactant to be used in the condensation reaction can be established.

Another important factor that must be taken into account concerning the polyoxyalkylene glycol reactant to be used in accordance with the practice of the invention is the water content thereof. The glycol reactant should be essentially free of water, that is, it should contain less than 0.1%, and preferably, 0.02% or less of water. The polyglycol may be treated by vacuum stripping or azeotropic distillation to remove undesirable amounts of water. A low water content in the glycol reactant is required because water is reactive with isocyanates and the presence thereof in any significant quantity will upset the OH/NCO stoichiometry of the ensuing condensation reaction.

As pointed out hereinabove, in polyoxyalkylene glycols suitable for use in preparing polyoxyalkylene glycol block copolymers of the invention at least 50 percent by weight of the oxyalkylene groups in the chain must be oxyethylene groups, and preferably, should be from about 65 to 85 percent by weight of the total weight.

Suitable diisocyanates as hereinabove described for use in preparing the polyoxyalkylene glycol block copolymers of the invention may be any aromatic or aliphatic difunctional diisocyanates having a molecular weight of up to about 1500; or mixtures thereof.

Regardless of the type or types of diisocyanate used, the equivalent weight or free NCO content must be determined before using it as a reactant in the condensation reaction of the invention.

The condensation is preferably carried out in bulk without the use of solvents or diluents, though if desired, a solvent can be used which is nonreactive and inert to the reactants. In a preferred embodiment, the polyoxyalkylene glycol reactant, and catalyst, if one is desired, are charged to a heated reactor and the diisocyanate reactant is fed to the heated reactor. The time of addition is not critical and is generally chosen so that the exotherm does not exceed the cooling capabilities of the reactor. It is desirable to blanket the reaction charge with an inert gas such as nitrogen to prevent color buildup due to oxidation.

After completion of the condensation reaction, the high viscosity products formed are preferably removed from the reactor while still hot in order to facilitate the material transfer. Alternatively, a preferred procedure may involve converting the bulk reaction product directly to an aqueous concentrate, e.g. a 50% aqueous solution, by adding the required amount of water directly into the reaction product after completion of the condensation reaction and using the reactor agitator to form a solution at a temperature of 50° C. to 100° C.

Efficient agitation of the reaction mixture is an important factor in the process because of the high viscosity of the reaction product, and suitable agitation means must be provided.

The temperature at which the condensation reaction can be carried out is not narrowly critical but will generally range from about 40° C. to about 175° C., and preferably, from about 50° C. to about 125° C. The pressure used is, also, not critical and may be varied widely, though atmospheric pressure is generally preferred.

The condensation reaction can be effected with or without a catalyst being present, but generally, it is preferred that a catalyst is employed. From about 0.01 percent to about 0.1 percent, based on the weight of polyoxyalkylene glycol, of a catalyst typically employed in the preferation of polyurethanes, such as DABCO, stannous octoate, dibutyltin dilaurate, and the like, can be advantageously employed. When carried out in the presence of a catalyst, the reaction proceeds rapidly and as little as 10 minutes may be satisfactory though about 1 hour is generally preferred.

The invention is further described in the Examples which follow. All parts and percentages are by weight unless otherwise specified.

EXAMPLE I

A quantity of a diethylene glycol started ethylene oxide/propylene oxide (75/25 by weight) polyoxyalkylene glycol having a nominal viscosity of 5000 SUS (approx 1000–1400 centistokes) and a molecular weight of 4000–5000 was neutralized by heating for one hour at 100° C. with 2 percent by weight of magnesium silicate purchased under the trademark designation Magnesol. The polyglycol was then filtered and vacuum stripped.

The neutralized polyglycol was analyzed and determined to have a molecular weight of 4924, a water content of 0.04 percent, a viscosity of 976 centistokes at 100° F. and no alkalinity.

A 1-liter glass resin kettle fitted with an agitator (4-bladed, pitched blade types operated at 300 rpm), temperature recording thermocouple, feed tank, and an inert gas inlet tube was used in carrying out the condensation reaction experiments of this Example.

A series of four reaction experiments was run using the proportion of reactants summarized in Table I and the following procedures:

The neutralized polyoxyalkylene glycol and the catalyst were charged to the reaction vessel and a nitrogen blanket was then fed into the reactor. The reactants were heated to 55° C.–60° C. with agitation. Molten 4,4'-methylenebis (phenylisocyanate) (MDI) was then fed into the reactant charge through the feed tank, using a total feed time of about 10 minutes. The temperature was allowed to rise as the reaction exothermed and the charge built viscosity. Following addition of all the MDI, the temperature was increased to about 100° C. and maintained there for about one hour. The viscous copolymer was then discharged from the reactor while hot and then analyzed. The characterization data determined for each of the reaction products prepared in this Example are also summarized in Table I, below.

TABLE I

|  | EXPERIMENTAL REACTION | | | |
| --- | --- | --- | --- | --- |
|  | A | B | C | D |
| Reactants Charge (grams) | | | | |
| Polyglycol | 492.4 | 300.36 | 300.36 | 300.36 |
| Catalyst | 0.246 | 0.15 | 0.15 | 0.15 |
| MDI | 17.91 | 10.56 | 10.16 | 9.62 |
| OH/NCO Ratio | | | | |
| Overall Basis | 1.549 | 1.604 | 1.666 | 1.761 |
| Isocyanate Moiety (wt. % of reactants) | 3.51 | 3.40 | 3.27 | 3.10 |
| Product Molecular Weight | | | | |
| By OH Number | 13,256 | 12,174 | 11,648 | 9,906 |
| By GPC (Gel Permeation Chromatography) | 12,460 | 13,210 | 13,300 | 11,380 |
| Actual Degree of Polymerization (From OH Number Molecular Weight) | 4.85 | 4.29 | 4.00 | 3.39 |
| Product Viscosity (CKS at 100° F.) | | | | |
| Bulk Fluid | 137,300 | 100,800 | 77,100 | 48,900 |
| 50% Aqueous Sol'n | 1,740 | 1,355 | 1,123 | 810 |
| Product Cloud Point, °C. | | | | |
| 50% Aqueous Sol'n | 83 | 83 | 84 | 84 |
| 1% Aqueous Sol'n | 58 | 60 | 61 | 62 |

The catalyst used in this example was dibutyltin dilaurate and the OH number and Gel Permeation Chromatography are standard techniques for determining the molcular weight of polymers.

It is apparent that high molecular weight, water soluble polymers were prepared which exhibit extremely high viscosities.

EXAMPLE 2

Using the procedure and apparatus of Example 1, a series of 5 reaction experiments was run to study the relationship of isocyanate moiety content of the copolymer prepared and viscosity. The proportions of reactants are summarized in Table II.

In this Example a diethylene glycol started ethylene oxide/propylene oxide (75/25 by weight) having a nominal viscosity of 5000 SUS at 100° F. (1000–1400 cks) and a molecular weight of 4000–5000 was used after neutralizing by the technique of Example 1. After neutralization, the polyoxyalkylene glycol was determined to have a molecular weight of 4,170, a water content of 0.016 percent, a viscosity of 1,134 centistokes (cks) at 100° F. and a nil alkalinity. The diisocyanate and catalyst of Example 1 were used in the experiments of this Example.

After completion of the reaction in each of the experiments of this example, the reaction product was discharged from the reactor while hot. An analysis of the properties determined for the reaction products of each of the experiments is summarized in Table II.

It is apparent from the data that high molecular weight, high viscosity, water soluble copolymers are prepared in each of the reaction experiments of the Example. It is also shown that increasing the isocyanate moiety content of the copolymer results in a product that exhibits a higher viscosity.

TABLE II

|  | Reaction Experiment | | | | |
| --- | --- | --- | --- | --- | --- |
| Reactant Weights (grams) | | | | | |
| Polyglycol | 333.6 | 834 | 333.6 | 333.6 | 333.6 |
| Catalyst | 0.167 | 0.411 | 0.167 | 0.167 | 0.167 |
| MDI (diisocyanate) | 15.99 | 39.27 | 15.39 | 14.29 | 13.33 |
| OH/NCO Ratio | | | | | |
| Overall basis | 1.298 | 1.321 | 1.348 | 1.454 | 1.557 |
| Weight % Isocyanate Moiety | 4.57 | 4.50 | 4.41 | 4.10 | 3.84 |
| Reaction Product Properties | | | | | |
| Molecular Weight | | | | | |
| By OH Number | 13,438 | 12,940 | 12,759 | 12,287 | 11,315 |
| Gel Permeation Chromatography (GPC) | 15,760 | 15,270 | 14,130 | 15,400 | 14,240 |
| Actual Degree of Polymerization (From OH Number Molecular Weight) | 5.65 | 5.40 | 5.29 | 4.95 | 4.45 |
| Viscosity (CKS. at 100° F.) | | | | | |
| Bulk Fluid | 255,590 | 204,142 | 165,696 | 134,770 | 77,640 |
| 50% Aqueous Sol'n | 2,888 | 2,584 | 2,196 | 1,797 | 1,209 |
| Cloud Point °C. | | | | | |
| 1% Aqueous Solution | 52.5 | 51.5 | 52 | 54 | 56 |

EXAMPLE 3

Using the procedure and apparatus of Example 1, a condensation reaction was carried out using the following proportion of ingredients.

| Polyglycol | 333.6 grams |
| --- | --- |
| Catalyst | 0.167 grams |
| Toluene Diisocyanate (TDI) | 10.92 grams |

The polyglycol used was the neutralized polyglycol of Example 2 which after neutralization had a molecular weight of 4,170, a water content of 0.016%, viscosity at 100° F. of 1,134 centistokes and a nil alkalinity. The catalyst used was the catalyst of Example 1.

After completion of the condensation reaction, the reaction products were removed while hot from the reactor and an analysis thereof made. In Table III, below, are summarized the results of the analysis.

TABLE III

| Reactant Parameters | |
| --- | --- |
| Polyglycol Molecular Weight | 4,170 |
| Viscosity, cks. | 1,134 |
| OH/NCO Ratio (Polyol basis) | 1.276 |
| Weight % Isocyanate Moiety | 3.17 |
| Reaction Product Properties | |

TABLE III-continued

| Molecular Weight | |
|---|---|
| By OH Number | 11,214 |
| By GPC | 13,600 |
| Actual Degree of Polymerization (From OH Number Mol. Wt.) | 4.58 |
| Viscosity, cks, at 100° F. | |
| Bulk Fluid | 110,826 |
| 50% Aqueous Solution | 1,057 |
| Cloud Point, °C. | |
| 50% Aqueous Solution | 84 |
| 1% Aqueous Solution | 63 |

As is apparent from the data, a high molecular weight, high viscosity, water soluble copolymer was prepared.

EXAMPLE 4

A polyoxyalkylene glycol which was a random structure ethylene oxide/propylene oxide copolymer (77/23 by weight) prepared by reacting a stream of 75/25 ethylene oxide-propylene oxide with an initiator which was the reaction product of bisphenol A and 6 moles of ethylene oxide was used in this experiment. The polyoxyalkylene glycol, which was neutralized by ion-exchange techniques and vacuum stripped, had a number average molecular weight of 5,095 and a viscosity at 100° F. of 1420 cks (6565 SUS).

Using the procedure and apparatus of Example 1 a condensation reaction was carried out using the following proportion of ingredients.

| | |
|---|---|
| Polyglycol | 305.7 grams |
| Catalyst | 0.158 grams |
| MDI | 10.17 grams |
| OH/NCO ratio (polyol basis) | 1.485 |
| Weight % Isocyanate Moiety | 3.20 |

The reaction product was removed hot from the reactor and analyzed. A summary of the properties determined for the reaction product are reported in Table IV, below.

TABLE IV

| Polyglycol Reactant | |
|---|---|
| Molecular Weight | 5095 |
| Viscosity @ 100° F., cks. | 1420 |
| Reaction Product Molecular Weight | |
| By OH Number | 11,702 |
| By GPC | 13,480 |
| Viscosity @ 100° F., cks. | |
| Bulk Fluid | 93,397 |
| 50% Aqueous Solution | 1,672 |
| Cloud Point, °C. | |
| 50% Aqueous Solution | 73.5 |
| 1% Aqueous Solution | 40.5 |

From the data, it is apparent that a high molecular weight, high viscosity, water soluble copolymer was produced.

EXAMPLE 5

Using the procedure and apparatus of Example 1, a series of three experimental reactions were carried out using the following properties of ingredients:

| | A | B | C |
|---|---|---|---|
| Polyglycol (grams) | 236.95 | 236.95 | 236.95 |
| Catalyst (grams) | 0.118 | 0.118 | 0.118 |
| MDI (grams) | 8.32 | 8.94 | 10.0 |
| OH/NCO Ratio (overall basis) | 1.539 | 1.432 | 1.280 |
| Weight % Isocyanate Moiety | 3.39 | 3.64 | 4.05 |

The polyoxyalkylene glycol used in this Example was the same as the polyglycol used in Example 2, except that it was neutralized by ion-exchanging and then vacuum stripped. The polyglycol had a molecular weight of 4,739, a water content of 0.0088%, a viscosity at 100° F. of 1,179 cks., and a nil alkalinity. The catalyst and isocyanate used here were the same as that used in Examples 1 and 2.

A summary of the analysis of the reaction products from each of the experimental reactions is reported in Table V. It is apparent from the data that high molecular weight, high viscosity, copolymers were prepared by each experimental reaction.

TABLE V

| | Experimental Reaction | | |
|---|---|---|---|
| | A | B | C |
| Polyglycol Reactant | | | |
| Molecular Weight | 4,739 | 4,739 | 4,739 |
| Viscosity @ 100° F., CKS. | 1,179 | 1,179 | 1,179 |
| OH/NCO Ratio | 1.539 | 1.432 | 1.280 |
| Reaction Products Molecular Weight | | | |
| By OH Number | 9,170 | 10,200 | 11,030 |
| By GPC | 11,290 | 12,710 | 13,840 |
| Viscosity, Cks. @ 100° F. | | | |
| Bulk Fluid | 43,555 | 63,711 | 98,973 |
| 50% Aqueous Solution | 832 | 1,047 | 1,474 |
| Cloud Points, °C. | | | |
| 50% Aqueous Solution | 82 | 82 | 80.5 |
| 1% Aqueous Solution | 57.5 | 57 | 54.5 |

EXAMPLE 6

Using the procedure and apparatus of Example 1, a series of four experimental reactions were carried out using the following proportion of ingredients:

| | | | | |
|---|---|---|---|---|
| Polyglycol (grams) | 384.2 | 384.2 | 384.2 | 384.2 |
| Catalyst (grams) | 0.192 | 0.192 | 0.192 | 0.192 |
| Diisocyanate (grams) | 34.12 | 33.52 | 32.74 | 31.93 |
| OH/NCO Ratio (overall basis) | 1.102 | 1.132 | 1.159 | 1.189 |
| Weight % Isocyanate | 8.26 | 8.03 | 7.85 | 7.67 |

The polyoxyalkylene glycol used was diethylene glycol started ethylene oxide/propylene oxide (75/25 by weight) random copolymer. The polyoxyalkylene glycol did not require neutralization but was vacuum stripped prior to use. The material had a molecular weight of 2,561, a water content of 0.0082 percent, a viscosity at 100° F. of 347 centistokes and a nil alkalinity. The catalyst and diisocyanate of Example 1 were used in this Example.

The reaction products prepared during each experimental reaction were analyzed and the properties determined are summarized in Table VI. It is apparent from the data that a high molecular weight, high viscosity, water soluble copolymer was produced.

TABLE VI

|  | Experimental Reaction | | | |
|---|---|---|---|---|
|  | A | B | C | D |
| Polyglycol Reactant | | | | |
| Molecular Weight | 2,561 | 2,561 | 2,561 | 2,561 |
| Viscosity @ 100° F., cks. | 347 | 347 | 347 | 347 |
| OH/NCO Ratio | 1,102 | 1.132 | 1.159 | 1.189 |
| Reaction Products | | | | |
| Molecular Weight | | | | |
| By OH Number | 12,021 | 10,896 | 9,766 | 8,459 |
| Viscosity, cks, 100° F. | | | | |
| Bulk Fluid | 304,529 | 249,710 | 174,454 | 124,899 |
| 50% Aqueous Solution | 2,656 | 2,508 | 2,024 | 1,538 |
| Cloud Point, °C. | | | | |
| 50% Aqueous Solution | 61 | 62.5 | 63.5 | 64 |
| 1% Aqueous Solution | 29.5 | 30.5 | 32.5 | 34.5 |

EXAMPLE 7

Using the procedure and apparatus of Example 1, two experimental reactions were run using a 40/60 mole percent and 30/70 mole percent mixture of the polyoxyalkylene glycol used in Example 5 (75/25 by weight random EO/PO copolymer) and a diethylene glycol started ethylene oxide propylene oxide (85/15 by weight) random copolymer polyoxyalkylene glycol. Each of the polyglycols was neutralized by ion-exchanging and then vacuum stripped. The 75/25 copolymer had a molecular weight of 4,739 and a viscosity of 1,179 cks at 100° F. while the 85/15 copolymer had a molecular weight of 1389 and a viscosity of 178 cks at 100° F. The proportion of ingredients in each of the two experimental reactions were as follows:

|  | A | B |
|---|---|---|
| 75/25 Polyglycol (grams) | 223.56 | 158.99 |
| 85/15 Polyglycol (grams) | 96.67 | 106.95 |
| Catalyst (grams) | 0.16 | 0.133 |
| Diisocyanate (grams) | 25.14 | 25.0 |
| OH/NCO Ratio (polyol basis) | 1.153 | 1.095 |
| Weight % Isocyanate | 7.3 | 11.15 |

The catalyst and diisocyanate reactants used in this Example were the same as were used in Example 1.

The reaction products obtained from each of the two experimental reactions were analyzed and the results determined are summarized in Table VII. The data shows that high molecular weight, high viscosity, water soluble copolymers were produced during each of the experimental reactions of this Example.

TABLE VII

| Reactants | | |
|---|---|---|
| 75/25 Polyglycol mole % | 40 | 30 |
| Molecular Weight | 4,739 | 4,739 |
| Viscosity at 100° F., cks | 1,179 | 1,179 |
| 85/15 Polyglycol mole % | 60 | 70 |
| Molecular Weight | 1,389 | 1,389 |
| Viscosity at 100° F., cks | 178 | 178 |
| OH/NCO Ratio (polyol basis) | 1.153 | 1.095 |
| Reaction Products | | |
| Molecular Weight | 12,023 | 11,968 |
| By OH Number | | |
| Viscosity, cks, 100° F. | | |
| Bulk Fluid | 303,098 | 552,525 |
| 50% Aqueous Solution | 2,519 | 4,163 |
| Cloud Point, °C. | | |
| 50% Aqueous Solution | 77 | 73 |
| 1% Aqueous Solution | 47.5 | 39.5 |

EXAMPLE 8

Using the apparatus and procedure of Example 1, 864.5 grams of a polyoxyalkylene glycol having a molecular weight of 2,561 and a 75/25 ethylene oxide/propylene oxide random composition is reacted with 51.39 grams of toluene diisocyanate (80/20 2,4/2,6 type) at 100° C. in the absence of any added catalysts. The reaction mixture is periodically examined by Infra-Red Spectroscopy to monitor the presence of unreacted —NCO functionality which absorbs at 4.42μ in the Infra-Red. When such instrumental analysis shows no —NCO functionality to be present, a wet chemical analysis for —NCO, using the standard method employing reaction with excess di-n-butylamine followed by back-titration of excess amine with hydrochloric acid, is run to confirm completion of the reaction. The reaction product is discharged while hot and a high viscosity, water soluble fluid copolymer is obtained.

What is claimed is:

1. A high molecular weight, high viscosity, liquid, water-soluble, random polyoxyalkylene glycol block copolymer having the formula:

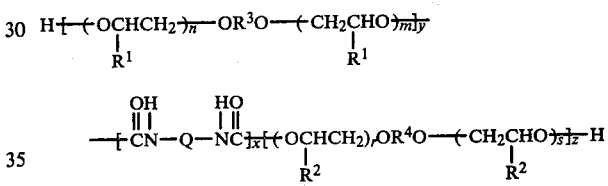

wherein Q is the organic residue from an aliphatic or aromatic diisocyanate selected from the group consisting of 4,4'-methylenebis (4-phenylisocyanate), tolylene diisocyanate, phenylene diisocyanate, 4,4'-methylenebis (cyclohexylisocyanate) and trimethylhexamethylene diisocyanate, or prepolymers derived therefrom having a molecular weight up to about 1500 and essentially free of monofunctional species capable of cross-linking; x is an integer representing the average number of polyurethane blocks in said copolymer and is about 1 to about 10; $R^1$ and $R^2$, are mixtures of hydrogen, methyl, or ethyl, with the proviso that the overall content of species wherein $R^1$ and $R^2$ are hydrogen must be at least 60 percent by weight; $R^3$ and $R^4$, which can be the same or different, are organic residues resulting from the removal of terminal hydrogen atoms from difunctional polyols selected from the group consisting of ethylene glycol, 1,2-propylene glycol, 1,3-propylene glycol, butylene glycol, diethylene glycol, dipropylene glycol, triethylene glycol, bisphenol A and mixtures thereof; y and z represent the average number of polyether blocks in said copolymer with the proviso that the sum of y and z must be from about 1.15 to 1.50 times the value of x; n, m, r, and s, which can be the same or different, are integers wherein n=m and r=s and the sums of n+m and r+s, which can be the same or different, are each in the range wherein each of the polyether blocks in said copolymer has a molecular weight within the range of about 1500 to about 6000; wherein each of said polyether blocks is the residue of a liquid, watersoluble diol of molecular weight from about 1500 to about 6,000 and having a random molecular structure comprising a random copolymer of mixed alkylene oxides selected from the group consisting of ethylene oxide, propylene oxide and butylene oxide wherein about 65 to 85 percent by weight of the total weight of the diol is ethylene oxide, and wherein said block copolymer is water-soluble and suitable for use as a functional fluid in an aqueous medium.

2. The block copolymer of claim 1 wherein $R^1$ and $R^2$ are mixtures of hydrogen and methyl.

3. The block copolymer of claim 1 wherein Q is an organic residue from an aromatic diisocyanate.

4. The block copolymer of claim 1 wherein $R^3$ and $R^4$ are alkylene, arylene, alkarylene, aralkylene radicals or mixtures thereof.

5. The block copolymer of claim 2 wherein Q is an organic residue from an aromatic diisocyanate.

6. The block copolymer of claim 5 wherein $R^3$ and $R^4$ are alkylene radicals.

7. The block copolymer of claim 5 wherein $R_3$ and $R_4$ are alkarylene radicals.

8. The block copolymer of claim 6 wherein $R^3$ and $R^4$ are short chain alkylene radicals of 2 to 6 carbon atoms.

9. A method of preparing the water-soluble, high molecular weight polyoxyalkylene glycol block copolymers of claim 1 which comprises reacting with vigorous agitation and for the time necessary to prepare a hydroxyl-terminated block copolymer a stoichiometric excess of a polyoxyalkylene diol containing at least 60 percent by weight of oxyethylene groups with an organic diisocyanate having molecular weight up to about 1500 wherein the total equivalent of hydroxyl functionality of said diol exceeds the equivalents of isocyanate functionality by a factor of from about 1.15 to 1.50:1.

10. The method of claim 9 in which said polyoxyalkylene diol has the formula:

$$R\text{-}[O\text{-}(CH_2CHR^1O)_nH]_2$$

wherein R is an organic residue resulting from the removal of terminal hydrogen atoms from diols and are alkylene, arylene, alkarylene, aralkylene, cycloalkylene, heterocycloarylene radicals or mixtures thereof, $R^1$ is hydrogen, methyl, ethyl or mixtures thereof, and n is an integer in the range of 4 to about 125.

11. The method of claim 9 in which said polyoxyalkylene diol is essentially free of alkalinity.

12. The method of claim 9 in which said polyoxyalkylene diol is essentially free of water.

13. The method of claim 11 in which said polyoxyalkylene diol is essentially free of water.

14. The method of claim 9 in which said organic diisocyanate is an aromatic diisocyanate.

15. The method of claim 11 in which said organic diisocyanate is an aromatic diisocyanate.

16. The method of claim 14 wherein $R^3$ and $R^4$ are short chain alkylene radicals of 2 to 6 carbon atoms.

* * * * *